(12) United States Patent
Yokota et al.

(10) Patent No.: US 8,094,415 B2
(45) Date of Patent: Jan. 10, 2012

(54) DISK DRIVE SUSPENSION

(75) Inventors: Masaki Yokota, Aiko-gun (JP); Akira Nojima, Aiko-gun (JP)

(73) Assignee: NHK Spring Co., Ltd., Yokohama-Shi (JP)

(*) Notice: Subject to any disclaimer, the term of this patent is extended or adjusted under 35 U.S.C. 154(b) by 456 days.

(21) Appl. No.: 12/419,477

(22) Filed: Apr. 7, 2009

(65) Prior Publication Data
US 2009/0262463 A1  Oct. 22, 2009

(30) Foreign Application Priority Data

Apr. 21, 2008 (JP) .................................. 2008-110482

(51) Int. Cl.
*G11B 5/56* (2006.01)
(52) U.S. Cl. .................................. 360/290; G9B/5.201
(58) Field of Classification Search .................. 360/290; G9B/5.201
See application file for complete search history.

(56) References Cited

U.S. PATENT DOCUMENTS

| | | |
|---|---|---|
| 5,602,698 A | 2/1997 | Miyazaki et al. |
| 6,269,532 B1 * | 8/2001 | Toensing ................ 29/603.02 |
| 6,956,720 B2 | 10/2005 | Takagi et al. |
| 7,230,798 B2 * | 6/2007 | Hashi et al. .............. 360/244.2 |
| 2006/0203377 A1 * | 9/2006 | Yamaguchi .............. 360/97.01 |
| 2006/0246748 A1 * | 11/2006 | Suzuki ......................... 439/67 |

FOREIGN PATENT DOCUMENTS

| | | |
|---|---|---|
| JP | 7-262724 A | 10/1995 |
| JP | 2003-203448 A | 7/2003 |
| JP | 2007-287296 A | 11/2007 |
| JP | 2008-4142 A | 1/2008 |

OTHER PUBLICATIONS

Japanese Office Action dated Oct. 4, 2011 (and English translation thereof) in counterpart Japanese Application No. 2008-110482.

* cited by examiner

*Primary Examiner* — Hoai V Ho
(74) *Attorney, Agent, or Firm* — Holtz, Holtz, Goodman & Chick, PC

(57) ABSTRACT

A suspension is provided with a base plate, load beam, and flexure. The base plate includes a boss portion, a first region situated on a side closer to a slider with respect to a center of the boss portion, and a second region situated on a side more remote from the slider. A pair of first projections are formed in the first region. A pair of second projections are formed in the second region. The projections project in the thickness direction of the base plate. The boss portion is inserted into a hole in an actuator arm, and the projections contact a suspension support portion of the actuator arm. The boss portion is pressurized from inside to be enlarged, whereby the base plate is fixed to the inner peripheral surface of the hole of the actuator arm.

6 Claims, 5 Drawing Sheets

DISK DRIVE SUSPENSION

CROSS-REFERENCE TO RELATED APPLICATIONS

This application is based upon and claims the benefit of priority from prior Japanese Patent Application No. 2008-110482, filed Apr. 21, 2008, the entire contents of which are incorporated herein by reference.

BACKGROUND OF THE INVENTION

1. Field of the Invention

This invention relates to a disk drive suspension used in an information processing apparatus provided with a disk for use as a recording medium.

2. Description of the Related Art

A hard disk drive (HDD) is used in an information processing apparatus such as a personal computer. The disk drive includes a magnetic disk rotatable around a spindle, arm (actuator arm) of a carriage turnable around a pivot, etc. A disk drive suspension is disposed on the distal end portion of the actuator arm.

The disk drive suspension includes a base plate fixed to the actuator arm, load beam attached to the base plate, flexure located along the load beam, etc. A slider is mounted on a tongue portion formed on the flexure. The slider is provided with an element (transducer) for reading or writing data.

As described in Jpn. Pat. Appln. KOKAI Publications Nos. 2007-287296 and 2008-004142, the base plate of the suspension is fixed to a suspension support portion of the actuator arm. For example, a boss portion formed on the base plate is inserted into a hole in the actuator arm. The boss portion is pressurized from inside by means of a jig. As the boss portion is plastically deformed (or increased in diameter), the base plate is fixed to the actuator arm.

When some suspensions were subjected to vibration tests, their sway vibration mode (resonance frequency across the slider) was found to be lower than a desired frequency. An intense investigation conducted by the inventors hereof revealed that this phenomenon is partly attributable to the state of a mounting area where the base plate is mounted on the actuator arm.

The suspension support portion (surface in contact with the base plate) of the actuator arm is precisely worked into a flat surface by grinding or the like. On the other hand, a mounting surface of the base plate that faces the suspension support portion is also worked into a flat surface by press working or the like. The base plate is formed by pressing a plate of a relatively soft metal, such as stainless steel. Thus, the surface accuracy after the press working is inevitably lower than that of the suspension support portion of the actuator arm.

In some cases, the base plate may be distorted or warped. If the base plate thus deformed is superposed on the suspension support portion of the actuator arm, the two may unstably contact each other, which was found to influence the vibrational characteristics of the suspension.

BRIEF SUMMARY OF THE INVENTION

The present invention provides a disk drive suspension of which the vibrational characteristics can be improved.

The invention is a disk drive suspension, which comprises a base plate fixed to a suspension support portion of an actuator arm of a disk drive, a load beam attached to the base plate, and a flexure located along the load beam and provided with a slider on a distal end portion thereof, the base plate including a mounting surface opposed to the suspension support portion, a boss portion which is inserted into a hole in the suspension support portion, a first region situated on a side of the mounting surface closer to the slider with respect to a center of the boss portion, a second region situated on a side of the mounting surface more remote from the slider with respect to the center of the boss portion, a pair of first projections formed individually on one and the other transverse sides, respectively, of the mounting surface within the first region and projecting toward the suspension support portion, and a pair of second projections formed individually on the one and the other transverse sides, respectively, of the mounting surface within the second region and projecting toward the suspension support portion, the boss portion being fixed to the actuator arm in such a manner that the boss portion is inserted into the hole of the actuator arm and that the projections are in contact with the suspension support portion.

According to this arrangement, the base plate of the suspension can be steadily fixed to the suspension support portion of the actuator arm, and the vibrational characteristics of the suspension can be improved.

In a preferred aspect of the invention, a pair of extending portions are formed on the rear end of the base plate so as to project behind the base plate, and the second projections are formed on the extending portions, individually. Alternatively, the projections may be formed individually at four corners of the mounting surface. Further, the boss portion is plastically deformed in such a manner that the boss portion is inserted into the hole of the actuator arm and that the projections are in contact with the suspension support portion, whereby an outer peripheral surface of the boss portion is fixed to an inner peripheral surface of the hole.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of the present invention will now be described with reference to FIGS. 1 to 8.

Figure 1:
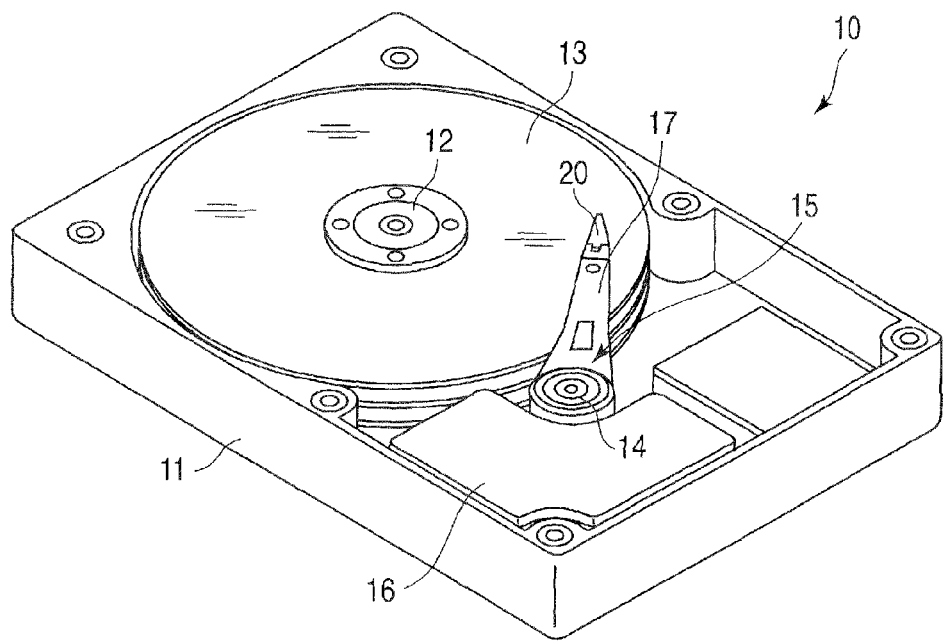
FIG. 1 is a perspective view of a disk drive with a suspension according to a first embodiment of the invention.

A hard disk drive (HDD) 10 shown in FIG. 1 includes a case 11, disks 13, carriage 15, positioning motor 16, etc. The disks 13 are rotatable around a spindle 12, while the carriage 15 is turnable around a pivot 14. The motor 16 serves to drive the carriage 15. The case 11 is hermetically closed by a lid (not shown).

Figure 2:
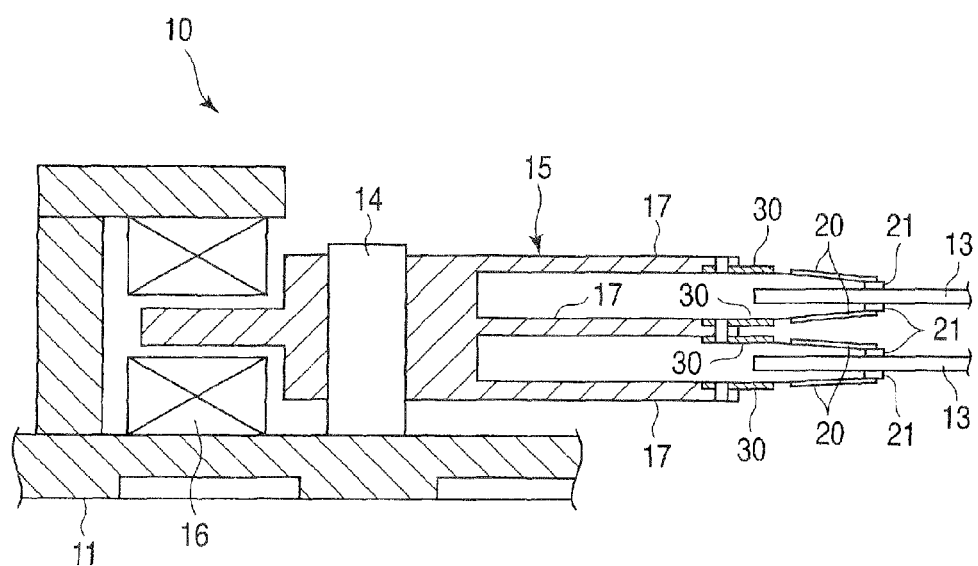
FIG. 2 is a partial sectional view of the disk drive shown in FIG. 1.

FIG. 2 is a sectional view typically showing a part of the disk drive 10. As shown in FIG. 2, the carriage 15 is provided with actuator arms 17. Disk drive suspensions (hereinafter referred to simply as the suspensions) 20 are mounted on the respective distal end portions of the actuator arms 17.

A slider 21 that constitutes a magnetic head is disposed on the distal end of each suspension 20. When each disk 13 rotates at a high speed around the spindle 12, an air bearing is formed between the disk 13 and its corresponding slider 21. When each actuator arm 17 is turned by the positioning motor 16, the suspension 20 moves radially relative to the disk 13. Thereupon, the slider 21 moves to a desired track of the disk 13.

Figure 3:
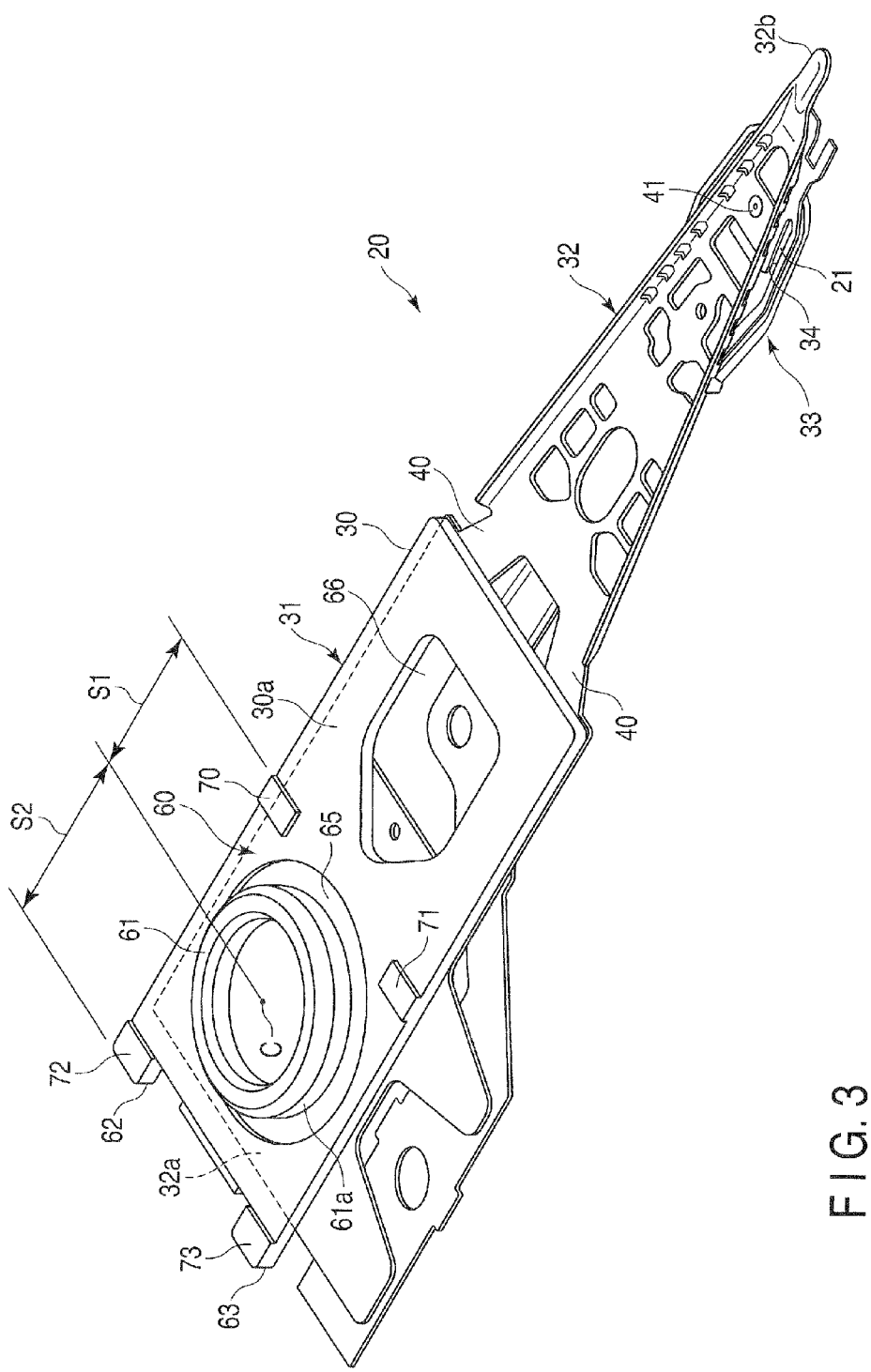
FIG. 3 is a perspective view of the suspension according to the first embodiment of the invention.

FIG. 3 shows an example of the suspension 20. The suspension 20 is provided with a base portion 31 including a base plate 30, load beam 32, flexure 33 with conductors, etc. The flexure 33 is located extending along the load beam 32 and superposed on the load beam 32 along its thickness. A tongue portion (gimbal portion) 34 is provided near the distal end portion of the flexure 33. The slider 21 (FIG. 3) is mounted on the tongue portion 34. The slider 21, which functions as the magnetic head, is provided with read and write elements (not shown).

As shown in FIG. 3, the load beam 32 includes a proximal portion 32*a* and distal end portion 32*b*. The proximal portion 32*a* of the load beam 32 is superposed and fixed on the base plate 30 by fixing means, such as laser welding. The thickness of the load beam 32 ranges, for example, from about 30 to 100 μm. A pair of springy hinge portions 40 are formed on a part of the load beam 32. The base plate 30 is thicker than the load beam 32, e.g., 100 μm or more in thickness.

The hinge portions 40 are formed near the base plate 30 and can bend along their thickness. Instead of forming the hinge portions 40 on the load beam 32, a hinge member (not shown) that is independent of the load beam 32 may be provided between the base plate 30 and load beam 32. A dimple 41 is formed near the distal end portion 32*b* of the load beam 32. The dimple 41 projects toward the tongue portion 34.

Figure 5:
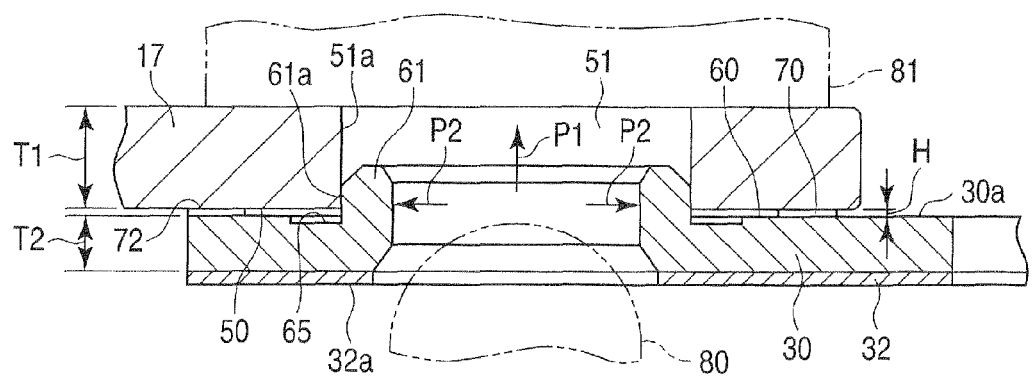
FIG. 5 is a sectional view of the suspension taken along line F5-F5 of FIG. 4.

The actuator arm 17 (FIGS. 1 and 2) of the carriage 15 is provided with a suspension support portion 50 (FIG. 5). The support portion 50 is precisely finished into a flat surface by grinding or the like. A circular hole 51 is formed in the support portion 50. As described below, the base plate 30 of the suspension 20 is fixed to the suspension support portion 50.

Figure 4:
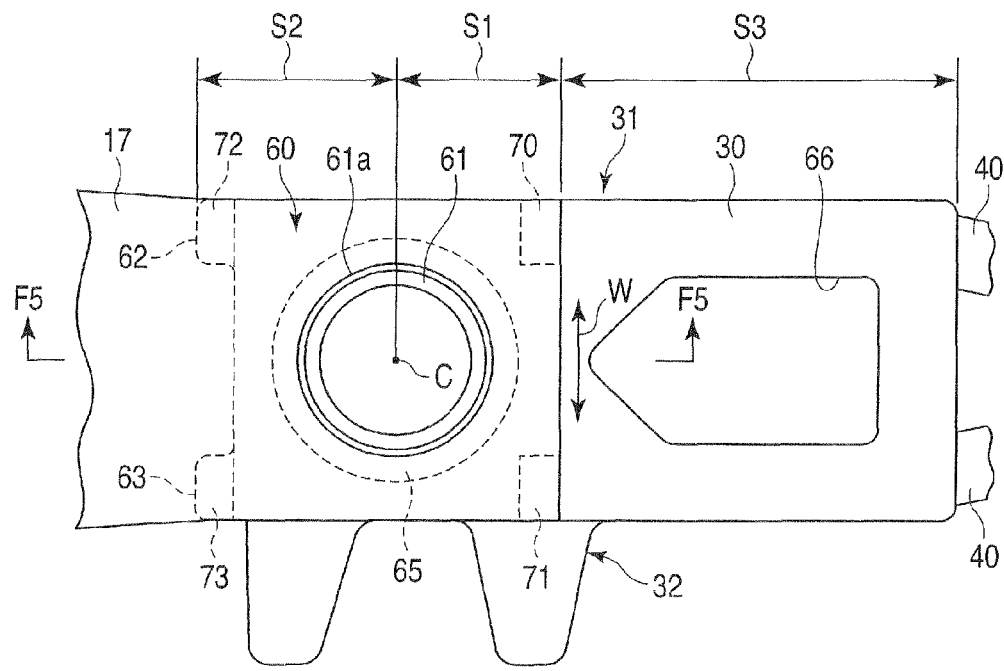
FIG. 4 is a partial plan view showing the suspension of FIG. 3 and an actuator arm.

As shown in FIGS. 3 to 5, the base plate 30 includes a mounting surface 60 that faces the suspension support portion 50 and a boss portion 61. The boss portion 61 is formed into a short cylinder by press working. A pair of extending portions 62 and 63 protrude rearward from the rear end of the base plate 30.

Before the base plate 30 is fixed to the suspension support portion 50, the outside diameter of the boss portion 61 is a little smaller than the inside diameter of the hole 51 of the actuator arm 17. Thus, the boss portion 61 is insertable into the hole 51. The boss portion 61 is inserted into the hole 51 of the actuator arm 17. As the boss portion 61 is pressurized from inside to be plastically deformed so that its diameter increases, an outer peripheral surface 61*a* of the boss portion 61 is fixed to an inner peripheral surface 51*a* of the hole 51.

As shown in FIGS. 3 and 4, the mounting surface 60 of the base plate 30 includes a first region S1 on the side closer to the slider 21 and a second region S2 on the side more remote from the slider 21, with respect to a center C of the boss portion 61. In other words, the front and rear halves of the boss portion 61 are formed in the first and second regions S1 and S2, respectively. A shallow annular recess 65 is formed around the boss portion 61.

Further, the base plate 30 includes a third region S3 (FIG. 4) that does not overlap the suspension support portion 50. An opening 66 is formed in the third region S3, whereby the base plate 30 is reduced in weight.

A pair of first projections or front projections 70 and 71 are formed near the boss portion 61 in the first region S1 of the base plate 30. These projections 70 and 71 are situated wide apart from each other on one and the other sides, respectively, of the base plate 30 with respect to its transverse direction (indicated by arrow W in FIG. 4).

The extending portions 62 and 63 are formed on the rear end of the second region S2 of the base plate 30. Second projections or rear projections 72 and 73 are formed on the extending portions 62 and 63, respectively. These projections 72 and 73 are situated wide apart from each other on the one and the other sides, respectively, of the base plate 30 with respect to the transverse direction (indicated by arrow W in FIG. 4).

The projections 70, 71, 72 and 73 project in the thickness direction of the base plate 30 toward the suspension support portion 50 of the actuator arm 17. The projections 70, 71, 72 and 73 have the same height H (FIG. 5), which is, for example, 5 μm. The height H is equivalent to the distance from a reference surface 30*a* of the base plate 30 to the top surface of each of the projections 70, 71, 72 and 73.

The projections 70, 71, 72 and 73 are formed by, for example, coining the base plate 30. The coining is a form of plastic working performed by using press equipment. The base plate 30 is struck along its thickness to produce a plastic flow therein by means of a die having a high-precision molding surface. By doing this, the mounting surface 60 with smooth surfaces, boss portion 61, recess 65, projections 70, 71, 72 and 73, and the like can be formed. The coining can prevent production of contamination particles (that create foreign matter), such as those produced by cutting or some other machining operation.

In mounting the suspension 20 on the actuator arm 17, the boss portion 61 of the base plate 30 is inserted into the hole 51 of the actuator arm 17, as shown in FIG. 5. In this state, the base plate 30 is pressurized in the direction indicated by arrow P1, and a jig 80 is press-fitted into the boss portion 61. When this is done, the front projections 70 and 71 and rear projections 72 and 73 contact the suspension support portion 50 of the actuator arm 17. The jig 80 serves to pressurize the boss portion 61 in the direction (radially) indicated by arrows P2 from inside. As the boss portion 61 is plastically deformed, it expands toward the inner peripheral surface 51*a* of the hole 51. Thus, the outer peripheral surface 61*a* of the boss portion 61 is fixed to the inner peripheral surface 51*a* of the hole 51 of the actuator arm 17.

The base plate 30 is formed of, for example, austenite stainless steel. The actuator arm 17 is formed of a metal harder and higher in bending stiffness than the base plate 30. In addition, a thickness T1 (FIG. 5) of the actuator arm 17 is greater than a thickness T2 of the base plate 30.

Even if the projections 70, 71, 72 and 73 are somewhat irregular in height, therefore, they can all be brought into contact with the suspension support portion 50 as the base plate 30 is deformed to some degree when the actuator arm 17 and base plate 30 are clamped by the jig 80 and a retaining member 81. If the boss portion 61 is plastically deformed from inside in this state, the outer peripheral surface 61*a* of the boss portion 61 is fixed to the inner peripheral surface 51*a* of the hole 51.

In the suspension 20 of the present embodiment, the extending portions 62 and 63 are formed on the rear end of the base plate 30, and the rear projections 72 and 73 are formed on the extending portions 62 and 63, respectively. Since the extending portions 62 and 63 protrude in the form of tongues from the rear end of the base plate 30, they can slightly bend (for several microns or more) along the thickness of the base plate 30.

Even if the projections 70, 71, 72 and 73 are varied in height or if the base plate 30 is somewhat distorted, therefore, the extending portions 62 and 63 can slightly bend along their thickness when the actuator arm 17 and base plate 30 are clamped thickness-wise. Therefore, all the projections 70, 71, 72 and 73 can be relatively easily brought into contact with the suspension support portion 50. Thus, the suspension 20 can be steadily fixed to the actuator arm 17. Alternatively, the projections 70, 71, 72 and 73 may be formed individually at the four corners of the mounting surface 60 of the base plate 30 without providing the extending portions 62 and 63.

Figure 6:
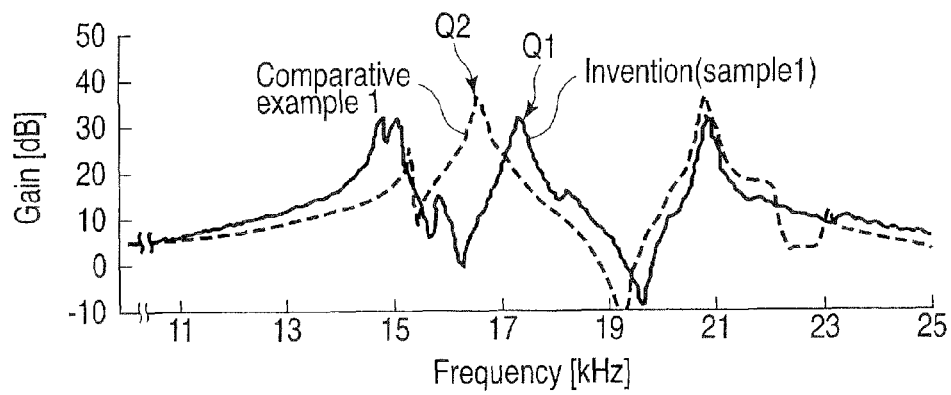
FIG. 6 is a diagram showing the vibrational characteristics of Sample 1 of the suspension of FIG. 3 and Comparative Example 1.
Figure 7:
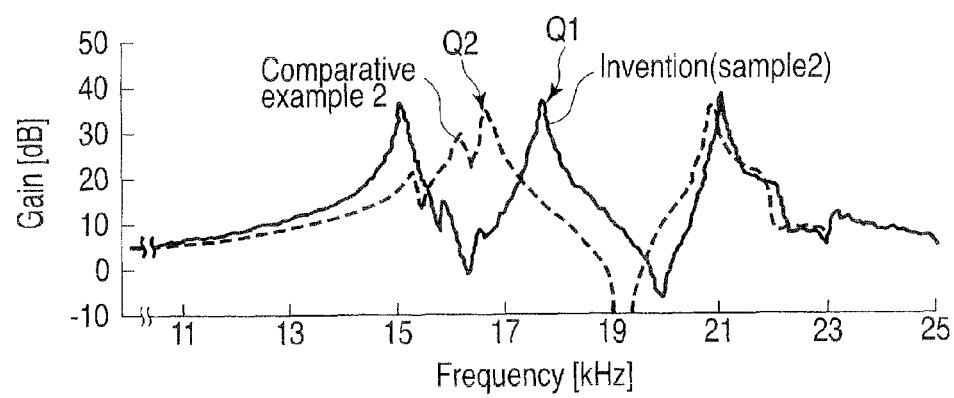
FIG. 7 is a diagram showing the vibrational characteristics of Sample 2 of the suspension of FIG. 3 and Comparative Example 2.
Figure 8:
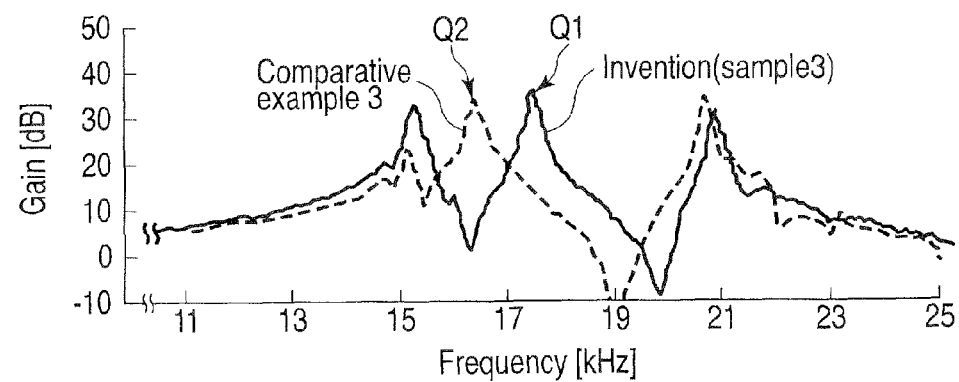
FIG. 8 is a diagram showing the vibrational characteristics of Sample 3 of the suspension of FIG. 3 and Comparative Example 3.

FIGS. 6 to 8 show results of measurement of vibrational characteristics of three Samples 1 to 3 of the suspension 20 and those of Comparative Examples 1 to 3. Waveforms indicated by solid lines in FIGS. 6 to 8 individually represent the vibrational characteristics of the suspension 20 according to the embodiment of the invention. Waveforms indicated by broken lines in FIGS. 6 to 8 individually represent the vibrational characteristics of the comparative examples without the projections 70, 71, 72 and 73.

Each suspension was fixed to a mounting jig that is equivalent to the actuator arm and was shaken in the sway direction (or transversely relative to the suspension) by means of a shaker. Vibration of the distal end of each suspension was measured by using a vibration measuring device, such as a laser Doppler vibrometer. Although the three Samples 1 to 3 share a common configuration, they have different apparent vibrational characteristics attributable to slight differences of the projections 70, 71, 72 and 73, and the like.

As can be seen from FIGS. 6 to 8, a peak Q1 of the resonance frequency of each sample of the suspension 20 according to the present invention is about 1 kHz higher than a peak Q2 of the resonance frequency of each of Comparative Examples 1 to 3. Specifically, the suspensions 20 with the projections 70, 71, 72 and 73 have a resonance frequency and vibrational characteristics higher than those of the suspensions without the projections.

Figure 9:
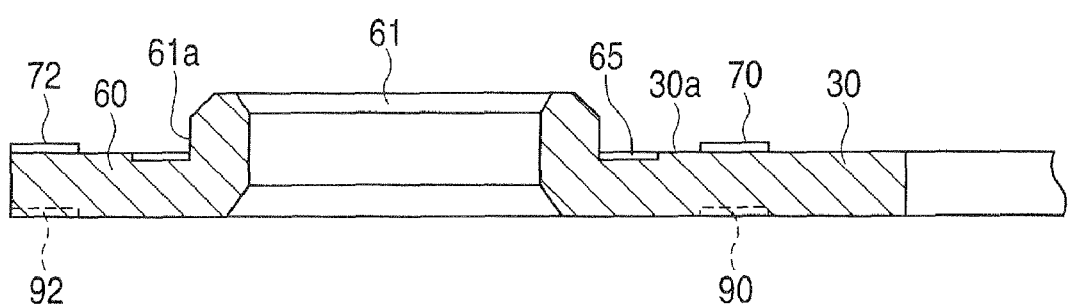
FIG. 9 is a sectional view of a base plate of a suspension according to a second embodiment of the invention.

FIG. 9 shows a part of a base plate 30 of a suspension according to another embodiment of the invention. This base plate 30 has recesses 90 and 92 formed in the reverse surfaces of projections 70 and 72, respectively, by press working. Specifically, the projections 70 and 72 are formed by being pushed out on the side opposite from the recesses 90 and 92 as these recesses are formed by press working. Similar recesses (not shown) are formed on the reverse side of projections 71 and 73 (FIG. 3) other than the projections 70 and 72. Also in the suspension of this embodiment, the base plate can be steadily fixed to a suspension support portion of an actuator arm, and the vibrational characteristics of the suspension can be improved.

It is to be understood, in carrying out the invention, that the shape, layout, height, etc., of the projections, as well as the specific configurations, shapes, and constructions of the base plate and load beam, are not limited to the foregoing embodiments and may be embodied in variously modified forms without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension, comprising:
a base plate fixed to a suspension support portion of an actuator arm of a disk drive;
a load beam attached to the base plate; and
a flexure located along the load beam and provided with a slider on a distal end portion thereof,
the base plate including a mounting surface opposed to the suspension support portion, a boss portion which is inserted into a hole in the suspension support portion, a first region situated on a side of the mounting surface closer to the slider with respect to a center of the boss portion, a second region situated on a side of the mounting surface more remote from the slider with respect to the center of the boss portion, a pair of first projections formed individually on one and the other transverse sides, respectively, of the mounting surface within the first region and projecting toward the suspension support portion, and a pair of second projections formed individually on the one and the other transverse sides, respectively, of the mounting surface within the second region and projecting toward the suspension support portion,
the boss portion being fixed to the actuator arm in such a manner that the boss portion is inserted into the hole of the actuator arm and that the projections are in contact with the suspension support portion.

2. A disk drive suspension according to claim 1, wherein a pair of extending portions are formed on the rear end of the base plate so as to project behind the base plate, and the second projections are formed on the extending portions, individually.

3. A disk drive suspension according to claim 1, wherein the projections are formed individually at four corners of the mounting surface.

4. A disk drive suspension according to claim 1, wherein the boss portion is plastically deformed in such a manner that the boss portion is inserted into the hole of the actuator arm and that the projections are in contact with the suspension support portion, whereby an outer peripheral surface of the boss portion is fixed to an inner peripheral surface of the hole.

5. A disk drive suspension according to claim 2, wherein the boss portion is plastically deformed in such a manner that the boss portion is inserted into the hole of the actuator arm and that the projections are in contact with the suspension support portion, whereby an outer peripheral surface of the boss portion is fixed to an inner peripheral surface of the hole.

6. A disk drive suspension according to claim 3, wherein the boss portion is plastically deformed in such a manner that the boss portion is inserted into the hole of the actuator arm and that the projections are in contact with the suspension support portion, whereby an outer peripheral surface of the boss portion is fixed to an inner peripheral surface of the hole.

* * * * *